United States Patent [19]

Wilkins

[11] 4,289,565

[45] Sep. 15, 1981

[54] APPARATUS FOR PUNCHING HOLES IN PAPER-LIKE SHEETS AND FOR SIMULTANEOUSLY PROVIDING REINFORCING MEMBERS THEREFOR

[76] Inventor: Harold B. Wilkins, 11171 Dorchester, Apt. 122, Southgate, Mich. 48195

[21] Appl. No.: 135,394

[22] Filed: Mar. 31, 1980

[51] Int. Cl.[3] .............................................. B32B 31/18

[52] U.S. Cl. .................................... 156/514; 156/253; 156/257; 156/261; 156/517; 156/518; 156/522; 156/530

[58] Field of Search ............... 156/513, 514, 517, 518, 156/522, 530, 252, 253, 257, 261; 118/37; 83/618, 609

[56] References Cited

U.S. PATENT DOCUMENTS

| | | | |
|---|---|---|---|
| 2,228,372 | 1/1941 | Stühlinger | 156/513 |
| 2,353,232 | 7/1944 | Greene | 156/253 |
| 2,413,500 | 12/1946 | Hummel | 156/252 |
| 3,898,919 | 8/1975 | Grimaldi | 156/514 |

FOREIGN PATENT DOCUMENTS

| | | | |
|---|---|---|---|
| 1248567 | 11/1960 | France | 156/514 |

*Primary Examiner*—Caleb Weston
*Attorney, Agent, or Firm*—Reising, Ethington, Barnard, Perry & Brooks

[57] ABSTRACT

An apparatus disclosed comprises a manual hole punch which is modified to provide reinforcing rings for punched holes during the punching operation. The modified hole punch includes a tape dispenser mounted at one end of the punch to dispense perforated tape, one side of which has an adhesive applied thereto. The modified hole punch aligns dispensed perforated tape both longitudinally and laterally so that when a piece of paper is inserted within the hole punch, punching units of the hole punch punch holes through the paper and through designated portions of the tape. Simultaneously, staple-shaped cutting members which are mounted on their associated punching elements of the punching units to move therewith, cut through the paper and through portions of the tape between the perforations in the tape to separate the reinforcing rings from the remainder of the tape. The cut tape is collected on a tape collector mounted at the opposite end of the hole punch.

10 Claims, 5 Drawing Figures

APPARATUS FOR PUNCHING HOLES IN PAPER-LIKE SHEETS AND FOR SIMULTANEOUSLY PROVIDING REINFORCING MEMBERS THEREFOR

TECHNICAL FIELD

This invention relates to an apparatus for punching holes in paper-like sheets and, in particular, to apparatus for punching holes in paper-like sheets while at the same time providing reinforcing members for the holes punched through the sheet.

BACKGROUND ART

Oftentimes documents have holes punched therethrough to provide a means for holding the documents in a file. Reinforcing rings are frequently placed about the punched holes to strengthen the area around the holes. However, because this extra step is required after the holes are punched it is often not performed. This extra step is often a nuisance to perform and therefore is not done or is done incorrectly, especially if the holes of the reinforcing ring and punched paper are not the same size. Consequently, documents which are placed in files without reinforcing members are frequently lost or misfiled because the documents easily tear or rip.

One possible solution is to provide more elaborate and/or complicated apparatus for securely holding the punched documents in their corresponding files.

DISCLOSURE OF THE INVENTION

An object of the present invention is to provide an improved apparatus which punches holes in paper-like sheets and which provides reinforcing members for the punched holes at the same time as the holes are punched.

Another object of this invention is to provide an improved apparatus including a hole puncher and a tape dispenser mounted on one end thereof and a tape collector mounted on the other end thereof for dispensing and collecting, respectively, a perforated tape which is punched and cut at the same time holes are punched in an inserted piece of paper to provide reinforcing members for the holes punched in the paper.

A further object of the invention is to provide an improved apparatus which punches holes in paper and simultaneously provides ring-shaped reinforcing members for the punched holes which have inner diameters equal to the diameters of the corresponding punched holes.

Yet another object of the present invention is to provide an improved apparatus having at least one punching unit and a cutting member mounted thereto to move therewith so that as the punching unit punches holes through an inserted perforated tape and an overlapping, inserted piece of paper while a punching element of the punching unit moves through a punching stroke, the cutting member removes a resulting reinforcing member from the rest of the tape during the punching stroke.

In carrying out the above objects and other objects of this invention a preferred embodiment of the invention includes a punch for punching holes in paper-like sheets and having at least one cylindrical punching element movably mounted on a support member of the punch. The punch includes a base member having an aperture aligned with the punching element and adapted to receive a punching end of the punching element at a top support surface of the base member. The punching element moves through a punching stroke between a retracted sheet-receiving position and an extended hole-punching position. The punching element extends into the aperture of the base member so that the punching element punches a hole through a sheet inserted between the base member and the punching element. At least one cutting member is operatively associated with the punch to move during the punching stroke of the punching element. The cutting element has at least one cutting blade extending below the top support surface of the base member in the hole-punching position of the punching element to cut through the sheet and an overlapping perforated tape disposed between the base member and the punching element so that a piece of the tape is separated from the remainder of the tape by the cutting action of the cutting blade and so that a substantially identical second hole is punched through the separated piece of tape by the punching element. The separated piece of tape defines a reinforcing member for reinforcing the area adjacent to and defining the hole in the sheet.

The objects, features and advantages of the present invention are readily apparent from the following detailed description of the best mode taken in connection with the accompanying drawings.

BEST MODE FOR CARRYING OUT THE INVENTION

Figures 1, 2, 3, 4, 5:
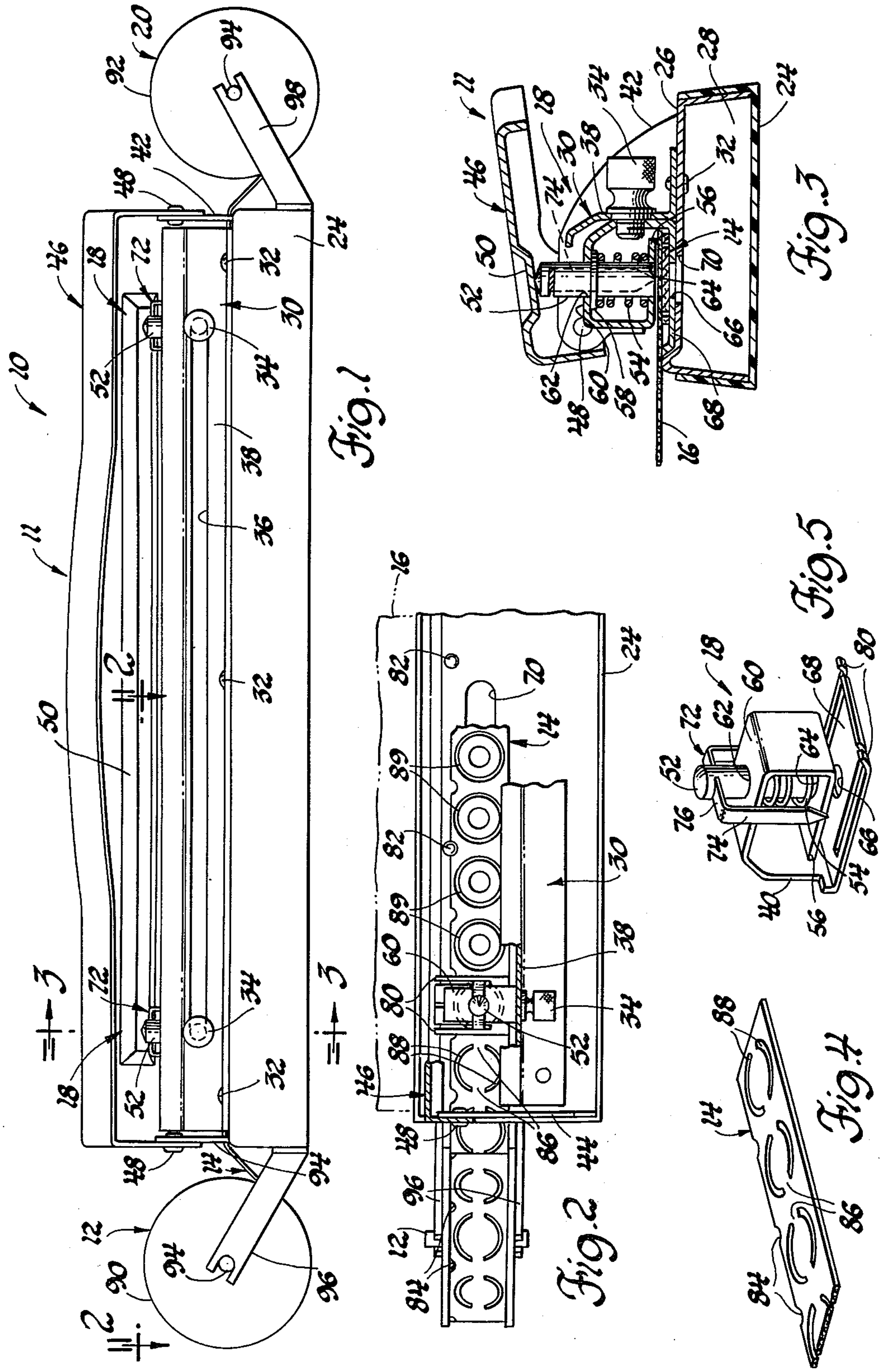
FIG. 1 is a back elevational view of the apparatus of the present invention.
FIG. 2 is a sectional view of the apparatus taken along line 2—2 of FIG. 1 with an inserted piece of paper shown in phantom.
FIG. 3 is a sectional view of the apparatus taken along line 3—3 of FIG. 1 showing an inserted piece of paper therein.
FIG. 4 is a partially broken away perspective view of a piece of tape particularly suitable for use with the apparatus.
FIG. 5 is a perspective view showing the particular construction of a punching unit constructed in accordance with the present invention.

Referring to FIG. 1 an apparatus constructed according to the present invention for punching holes and for simultaneously providing reinforcing members thereabout is indicated collectively by reference numeral 10. The apparatus 10 generally comprises a conventional hole puncher 11 which has been modified in accordance with the present invention. The apparatus 10 also includes a tape dispenser unit 12 which is mounted at one end of the hole puncher 11 and which is adapted to dispense a perforated tape 14 which is illustrated in FIG. 4. One side of the tape 14 has an adhesive formed thereon, the purpose of which will be more apparent hereinafter.

The perforated tape 14 is punched and cut together with an inserted piece of paper 16, as best shown in FIG. 3, by punching and cutting units 18, which are spaced along the longitudinal length of the hole puncher 11. The paper 16 and the tape 14 are punched and cut at the punching and cutting units 18 to thereby punch holes in the paper and to simultaneously form the reinforcing members for the holes. A tape collector unit 20 is mounted at the other end of the hole puncher 11 and is adapted to receive the cut tape 14 and to cooperate with the tape dispenser unit 12 to advance the tape 14 within the hole puncher 11.

With reference to FIG. 3, the hole puncher 11 includes a removable, plastic base plate 24 which is snugly secured on a bent metal support plate 26 thereabout. The space between the support plate 26 and the base plate 24 defines a storage area 28 for storing tapes such as tape 14 and also for storing the discs punched out from the tape 14 and the paper 16. The hole puncher 11 also includes a bent, generally vertical metal plate 30 which is fixedly secured at the top surface of the support plate 26 by a plurality of rivets 32 which are spaced along the longitudinal length of the hole puncher 11.

The punching and cutting units 18 are adjustably located along the longitudinal length of the hole puncher 11 by adjustment screws 34 which extend through an elongated slot 36 formed through an upwardly extending portion 38 of the vertical plate 30. The adjustment screws 34 also extend through a back wall member 40 of each of the punching and cutting units 18 to thereby removably secure the punching and cutting units 18 to the vertical plate 30.

The hole puncher 11 includes a pair of parallel, upwardly extending side flanges 42 and 44 which are integrally formed at opposite ends of the support plate 26. The side flanges 42 and 44 pivotally support an actuating lever 46 at pivots 48 which may comprise screws or rivets. An indented portion 50 of the actuating lever 46 engages the tops of cylindrical punching elements 52 of the punching and cutting units 18 when the actuating lever 46 pivots about the pivots 48 to move in a downward direction.

Each of the punching elements 52 are biased in an upward direction as shown in FIG. 3 by a spring 54 which extends between the top surface of an inwardly extending flange 56 and an integrally formed collar portion 58 of the punching elements 52. The spring 54 urges the collar portion 58 against the bottom surface of a top wall member 60 integrally formed with the flange 56 and the back wall member 40 of each of the punching and cutting units 18. The punching element 52 is slidably secured within openings 62 and 64 formed through the top wall member 60 and the flange 56, respectively.

The actuating lever 46 moves the punching elements 52 against the springs 54 from their retracted paper sheet receiving positions as shown in FIG. 3 to their extended hole-punching position wherein the bottoms of the punching elemets 52 extend into opening 66 formed through a base member or bottom wall member 68 integrally formed with the back wall member 40 as the punching elements 52 move through their punching strokes. In this way, each of the punching elements 52 punches aligned, identical holes through the tape 14 and the paper 16 disposed between the flanges 56 and the bottom wall members 68. The support plate 26 has an opening 70 formed therethrough to enable the discs punched from the tape 14 and the paper 16 to fall within the storage area 28.

Each of the punching and cutting units 18 includes a staple-shaped member 72 comprising a pair of parallel cutting blades 74 spaced apart by generally perpendicular element 76 integrally formed therewith. Each of the elements 76 are fixedly mounted within grooves 78 which are radially cut into the punching elements 52 near the tops thereof. The staple-shaped members 72 may be fixedly secured with the grooves 78 such as by welding or by an adhesive.

As best shown in FIG. 3 the cutting blades 74 are generally parallel to the longitudinal axes of the punching elements 52. The cutting edges of the cutting blades 74 extend substantially to the lower end surface of the punching elements 52. As a result, in the extended or punching position of the punching elements 52, the cutting blades 74 extend below the top surface of the bottom wall member 68. A pair of guide arms 80, integrally formed with the bottom wall member 68, and the side edges of the bottom wall member 68 define a space therebetween to allow the cutting blades 74 to move therein. The guide arms 80 thereby guide the cutting blades 74 during the cutting stroke of the punching elements 52.

Forward ends of the guide arms 80 and the bottom wall members 68 are bent and project upwardly to provide a guide space for the tape 14 so that the tape 14 is accurately positioned within the punching and cutting units 18 in a lateral direction. A plurality of spaced, and aligned locating members 82 as shown in FIG. 2 are formed along the longitudinal axis of the hole puncher 11. The locating members 82 may comprise rivets or studs mounted on the support plate 26 to locate the tape 14 within the hole puncher 11 along its length. The tape 14 includes a plurality of uniformly spaced indentations 84 formed on one edge thereof to permit the locating members 82 to be received therein, thereby locating the tape 14 with the hole puncher 11. When the tape 14 is properly located within the punching and cutting units 18, the cutting blades 74 are able to sever or cut areas 86 between curved perforations 88 formed through the tape 14 during the punching stroke of the punching elements 52.

After the punching stroke of the punching elements 52 is performed, a ring-shaped reinforcing member 89 is left about the hole punched through the paper 16. Casual finger pressure exerted between the reinforcing members 89 and the paper 16 upon removal of the sheet of paper 16 from the hole puncher 11 will fix the reinforcing member 89 firmly in place due to the fact that one side of the tape 14 has an adhesive applied thereto. Even though the cutting blades 74 leave a pair of small slits in the paper 16 when cutting the tape 14 the slits are substantially perpendicular to normal stresses and therefore do not cause any harm to the paper 16.

The tape dispenser unit 12 and the tape collector unit 20 include tape reels 90 and 92, respectively. Each of the tape reels 90 and 92 has a central pivot pin 94 connected thereto to allow its respective tape reel 90 or 92 to turn within forked mounting brackets 96 and 98, respectively. The mounting brackets 96 and 98 are fixedly connected at opposite ends of the hole puncher 11 so that the tape 14 is held against the top surface of the bottom wall member 68. Each of the tape reels 90 and 92 may be adjustable to provide a slight tension on the tape 14.

In operation, the tape 14, which extends between the reels 90 and 92, is held against the top surface of the bottom wall members 68 between the back wall members 40 and the forward portions of the guide arms 80 and the bottom wall members 68. The tape 14 is located within the hole puncher 11 along its longitudinal dimension by the locating members 82 which are received within the indentations 84. A piece of paper 16 is inserted and the actuating lever 46 is manually depressed thereby causing the punching elements 52 and the cutting blades 74 to simultaneously punch and cut the tape 14 and the paper 16 to form ring-shaped reinforcing members 89 for the corresponding holes punched through the paper 16. The actuating lever 46 is thereafter released so that the paper 16 and the reinforcing members 89 may be removed from the hole puncher 11. Pressure applied between the paper 16 and the reinforcing members 89 fix the ring-shaped reinforcing members 89 firmly in place about the holes punched through the paper 16.

While a preferred embodiment of the apparatus has been shown and described herein in detail, those skilled in the art will recognize various alternative designs and embodiments for practicing the present invention as defined by the following claims.

What is claimed is:

1. In combination with a punch for punching holes in paper-like sheets and having at least one cylindrical punching element movably mounted on a support member of the punch, the punch including a base member having an aperture aligned with the punching element and adapted to receive a punching end of the punching element at a top support surface of the base member, the punching element moving through a punching stroke between a retracted sheet-receiving position and an extended hole-punching position, the punching element extending into the aperture of the base member so that the punching element punches a hole through a sheet inserted between the base member and the punching element, the improvement comprising:

at least one cutting member operatively associated with said punch to move during the punching stroke of the punching element, the cutting member having at least one cutting blade extending below the top support surface of the base member in the hole punching position of the punching element to cut through an inserted sheet and an overlapping perforated tape disposed between the base member and the inserted sheet between the perforations in the tape so that a piece of the tape is separated from the remainder of the tape by the cutting action of the cutting blade and so that a substantially identical second hole is punched through the separated piece of tape by the punching element, wherein the separated piece of tape defines a reinforcing member for reinforcing the area adjacent to and defining the punched hole in the sheet.

2. The combination as claimed in claim 1 wherein the cutting member is mounted on the punching element to move therewith and comprises a staple-shaped member having a pair of cutting blades to cut two portions of the tape between perforations in the tape to separate the reinforcing member from the remainder of the tape at the same time the second hole is punched therethrough.

3. The combination as claimed in claim 1 or claim 2 including at least one locating member mounted on said punch for locating the perforated tape along its length with respect to the punching element.

4. The combination as claimed in claim 3 including a second locating member mounted on said punch for locating the tape along its width with respect to the punching element.

5. The combination as claimed in claim 1 or claim 2 wherein the punch includes a manually actuable lever, the lever engaging the punching element to move the punching element through its punching stroke to cut the paper-like sheet.

6. The combination as claimed in claim 1 or claim 2 including at least one guide member for guiding the cutting member during the cutting stroke.

7. The combination as claimed in claim 6 wherein the guide member is spaced from said base member, the guide member and the base member defining a cutting path for the cutting member below the top surface of the base member.

8. The combination as claimed in claim 1 or claim 2 including a tape dispenser mounted at one end of the punch and adapted to dispense the perforated tape.

9. The combination as claimed in claim 8 including a tape collector mounted at the opposite end of the punch and adapted to receive the cut tape.

10. The combination as defined in claim 9 wherein each of said tape collector and said tape dispenser includes a tape reel rotatably mounted at opposite ends of the punch so that the tape is held against the top support surface of the base member.

* * * * *